United States Patent
Weng et al.

(10) Patent No.: US 12,497,521 B1
(45) Date of Patent: Dec. 16, 2025

(54) SURFACE TREATMENT METHOD

(71) Applicant: ASUSTEK COMPUTER INC., Taipei (TW)

(72) Inventors: Jui-Huang Weng, Taipei (TW); Min-Hua Lin, Taipei (TW); Hsin-An Shu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 18/887,705

(22) Filed: Sep. 17, 2024

(30) Foreign Application Priority Data

Jul. 31, 2024 (TW) .................................. 113128562

(51) Int. Cl.
| | |
|---|---|
| *C09D 7/63* | (2018.01) |
| *C09D 7/20* | (2018.01) |
| *C09D 143/04* | (2006.01) |
| *C25D 11/02* | (2006.01) |

(52) U.S. Cl.
CPC .................. *C09D 7/63* (2018.01); *C09D 7/20* (2018.01); *C09D 143/04* (2013.01); *C25D 11/026* (2013.01)

(58) Field of Classification Search
CPC .......... C09D 7/63; C09D 7/20; C09D 143/04; C25D 11/026
See application file for complete search history.

(56) References Cited

U.S. PATENT DOCUMENTS

2020/0047462 A1* 2/2020 Wong ...................... B32B 37/06

FOREIGN PATENT DOCUMENTS

| CN | 108003693 A | 5/2018 |
|---|---|---|
| CN | 111944393 A | 11/2020 |
| CN | 114016109 A | 2/2022 |
| CN | 115323401 A | 11/2022 |
| CN | 118325452 A | 7/2024 |
| TW | 201718952 A | 6/2017 |

* cited by examiner

*Primary Examiner* — Nathan T Leong
(74) *Attorney, Agent, or Firm* — MUNCY, GEISSLER, OLDS & LOWE, P.C.

(57) ABSTRACT

The disclosure provides a surface treatment method which is suitable for a metal substrate. The metal substrate has an appearance surface. The surface treatment method comprises the following steps: first, applying surface sandblasting treatment to an appearance surface to form a sandblasted surface; subsequently, applying micro-arc oxidation treatment to the sandblasted surface in combination with an electrolytic solution to form a micro-arc oxidized surface; and then forming a coating to cover the micro-arc oxidized surface; wherein, the components of the electrolytic solution comprise sodium phosphate, sodium silicate, sodium aluminate, potassium fluoride, potassium hydroxide, ammonium vanadate, potassium vanadate, disodium ethylenediaminetetraacetic acid ($Na_2EDTA$) and sodium tetraborate.

11 Claims, 2 Drawing Sheets

SURFACE TREATMENT METHOD

CROSS-REFERENCE TO RELATED APPLICATION

This application claims the priority benefit of Taiwan application serial No. 113128562, filed on Jul. 31, 2024. The entirety of the above-mentioned patent application is hereby incorporated by reference herein and made a part of the specification.

BACKGROUND OF THE INVENTION

Field of the Invention

The disclosure relates to a surface treatment method, particularly to a surface treatment method in combination with a micro-arc oxidation (MAO) process.

Description of the Related Art

Traditionally, there is a need to apply appearance paint or paint coating to a micro-arc oxidized surface after a micro-arc oxidation process is applied to a metal substrate so as to present a final metal appearance effect while avoiding the abrasion of the micro-arc oxidized surface. The micro-arc oxidized surface formed by the traditional process cannot be directly used as an appearance surface.

BRIEF SUMMARY OF THE INVENTION

The disclosure provides a surface treatment method suitable for a metal substrate. The metal substrate has an appearance surface. The surface treatment method comprises the following steps: first, applying surface sandblasting treatment to the appearance surface to form a sandblasted surface; subsequently, applying micro-arc oxidation treatment to the sandblasted surface in combination with an electrolytic solution to form a micro-arc oxidized surface; and then forming a coating to cover the micro-arc oxidized surface; wherein, the components of the electrolytic solution comprise sodium phosphate, sodium silicate, sodium aluminate, potassium fluoride, potassium hydroxide, ammonium vanadate, potassium vanadate, disodium ethylenediaminetetraacetic acid ($Na_2EDTA$) and sodium tetraborate.

Compared with the traditional micro-arc oxidation process, the surface treatment method of the disclosure is that surface sandblasting treatment, micro-arc oxidation treatment and anti-fingerprint coating processes are combined to form a treatment technology for a ceramic appearance of a metal substrate. Further, the surface treatment method of the disclosure is that surface sandblasting treatment is carried out in advance before micro-arc oxidation treatment to eliminate the flaws on the surface of the metal substrate to provide exquisite surface texture while solving the rill mark problem of the metal substrate (especially a magnesium aluminum alloy). Subsequently, the appearance quality of the micro-arc oxidized surface after micro-arc oxidation treatment is improved by using a special electrolytic solution, so that the surface of the metal substrate presents a special stone-imitated texture appearance effect while promoting the surface strength of the metal substrate. Finally, a coating with an anti-fingerprint effect is formed by means of special paint to cover the micro-arc oxidized surface to promote the resistance of the metal substrate surface on the fingerprint sticking so as to prevent fingerprint residue.

It is noted that since the micro-arc oxidation treatment provided by the disclosure can effectively improve the surface strength of the metal substrate, there is no need to use appearance paint to conduct coating by a traditional technology after the micro-arc oxidation step, so as to effectively avoid the peeling of the appearance paint caused by user's collision.

DETAILED DESCRIPTION OF THE EMBODIMENTS

Next, specific embodiments of the disclosure will be described in detailed in combination with drawings. The advantages and features of the disclosure will become clearer according to the following descriptions and application patent scope. It is noted that accompanying drawings are all in extremely simplified forms and adopt non-precise scales, which are intended to facilitate and clarify the purpose of the embodiments of the disclosure.

Figure 1:
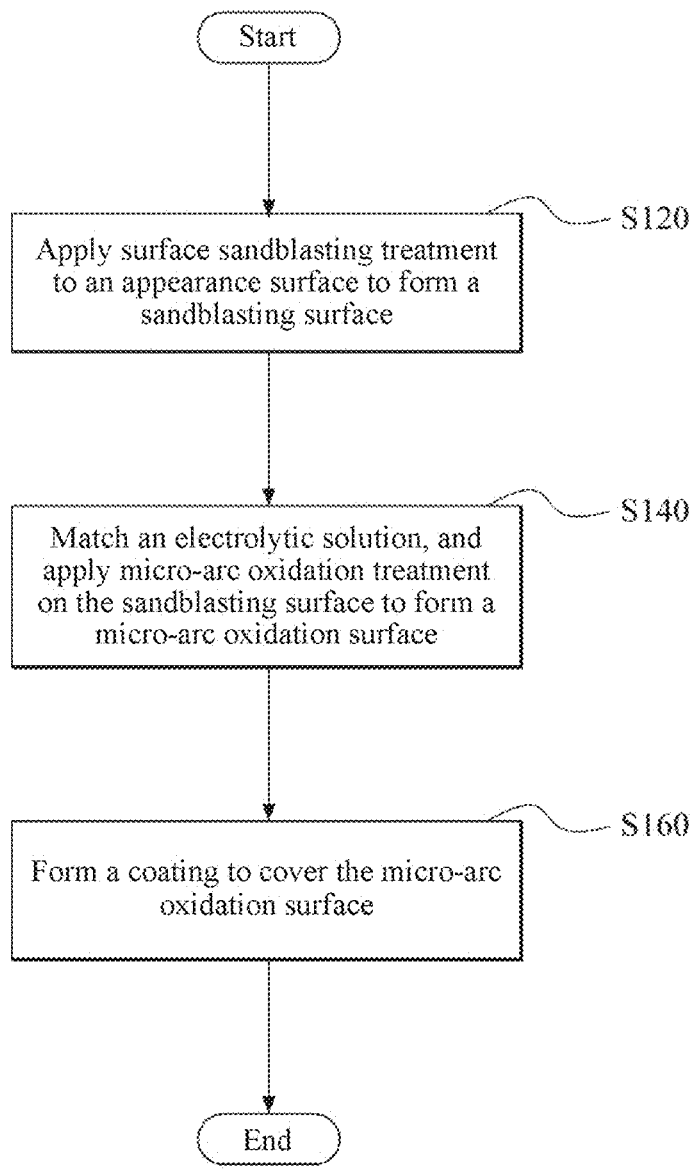
FIG. 1 is a flowchart of a surface treatment method according to an embodiment of the disclosure.

FIG. 1 is a flowchart showing a surface treatment method according to an embodiment of the disclosure. This surface treatment method is suitable for a metal substrate with an appearance surface. In an embodiment, the metal substrate is composed of an aluminum alloy, a magnesium aluminum alloy or a titanium alloy. But it is not limited thereto. Also, in an embodiment, the metal substrate is all or a part of a housing of an electronic device.

The surface treatment method comprises the following steps: first, as described in step S120, surface sandblasting treatment is applied to an appearance surface to form a sandblasted surface.

For the metal substrate composed of the aluminum alloy or the magnesium aluminum alloy, the sandblasting material used for the above surface sandblasting treatment is silicon dioxide glass sand of 220 to 280 mesh and a sandblasting pressure of from 0.2 MPa to 0.7 MPa. Also, in an embodiment, the sandblasting pressure can be set as 5 MPa. After undergoing the above surface sandblasting treatment, the arithmetic average roughness (Ra) of the sandblasted surface (that is to say, an appearance surface undergoing surface sandblasting treatment) is between 2.148 μm and 2.614 μm, and therefore can effectively remove the flaws on the surface of the metal substrate.

Specifically, the above step S120 comprises surface sandblasting treatment, washing and drying processes. First, the metal substrate is placed in a sandblasting machine and a pressure is applied to the sandblasting material, so that sand grains uniformly impact the surface of the metal substrate to form the sandblasted surface on the metal substrate. Then, the metal substrate subjected to sandblasting is washed in a degreasing cleaning tank, and then baked after the washing is completed.

Subsequently, as described in step S140, micro-arc oxidation treatment in combination with an electrolytic solution is applied to the sandblasted surface to form the micro-arc oxidized surface.

The components of the above electrolytic solution comprise sodium phosphate, sodium silicate, sodium aluminate, potassium fluoride, potassium hydroxide, ammonium vanadate, potassium vanadate, disodium ethylenediaminetetraacetic acid ($Na_2EDTA$) and sodium tetraborate. Also, in an embodiment, the electrolytic solution comprises 0.1-50 wt % of sodium silicate, 0.1-20 wt % of sodium aluminate, 0.1-20 wt % of potassium fluoride, 0.1-10 wt % of potassium hydroxide, 0.1-10 wt % of ammonium vanadate, 0.1-10 wt % of potassium vanadate, 0.1-10 wt % of disodium ethylenediaminetetraacetate (Na$_2$EDTA), and 0.1-10 wt % of sodium tetraborate. But the disclosure is not limited thereto. Also, a voltage for the micro-arc oxidation treatment ranges from 300 V to 750 V, and the treatment time for the micro-arc oxidation treatment is between 10 min and 60 min. Also, in a preferred embodiment, the time for micro-arc oxidation is 12 min.

Specifically, the above step S140 comprises micro-arc oxidation treatment, cooling and drying processes. First, the metal substrate after sandblasting treatment is placed in a micro-arc oxidation tank. The micro-arc oxidation tank is injected with the above electrolytic solution in advance. Subsequently, a voltage of 300 V-750V is applied to the metal substrate for plasma micro-arc oxidation of 10 min-60 min. Then, the metal substrate after the completion of the micro-arc oxidation process is cooled to room temperature in a cooling tank. Subsequently, the metal substrate after the completion of the micro-arc oxidation process is baked at 110° C.

Then, as described in step S160, a coating is formed to cover the micro-arc oxidations surface. In an embodiment, the coating is an anti-fingerprint coating, and the paint used in this step comprises propylene glycol methyl ether, water, nitrogen-based resin, acrylic resin and siloxane. But the disclosure is not limited thereto. According to actual demand, a coating with other functions (for example pollution resistance, reflection prevention, etc.) is also formed on the micro-arc oxidized surface.

Specifically, the above step S160 comprises a spraying process and a drying process. First, the metal substrate after the completion of the micro-arc oxidation process is placed in a micro-spraying device. Subsequently, the above paint is coated onto the micro-arc oxidized surface by using the micro-spraying device. Then, the micro-arc oxidized surface after spraying is baked at 105° C. to obtain a coating composed of an acrylic ester, a silicone polymer and a nano material to provide an ideal anti-fingerprint effect.

Figure 2:
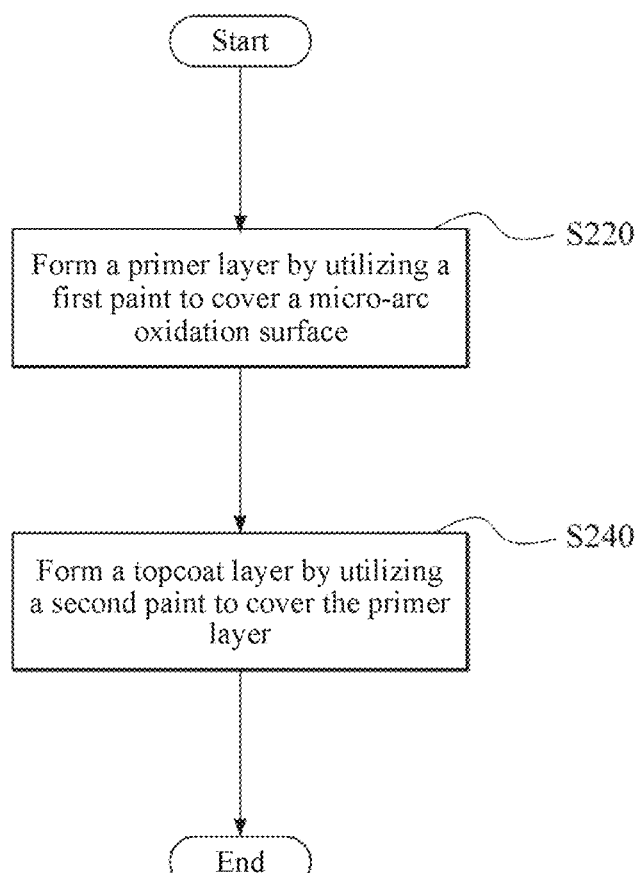
FIG. 2 shows an embodiment of step S160 in FIG. 1.

Please also refer to FIG. 2. FIG. 2 shows an embodiment of step S160 in FIG. 1.

Continue to step S140, after the completion of the micro-arc oxidation process, first, as described in step S220, a primer layer is formed by utilizing a first paint to cover the micro-arc oxidized surface. The first paint comprises propylene glycol methyl ether, water, nitrogen-based resin, acrylic resin, siloxane and silica.

Also, in an embodiment, the first paint comprises 5-12 wt % of propylene glycol methyl ether, 70-90 wt % of water, 0.5-2 wt % of nitrogen-based resin, 0.5-5 wt % of acrylic resin, 0.1-1 wt % of siloxane and nano organic silicone and 0.1-1 wt % of silica.

Subsequently, as described in step S240, a topcoat layer is formed by utilizing a second paint to cover the primer layer. The second paint comprises propylene glycol methyl ether, water, nitrogen-based resin, acrylic resin and siloxane.

The second paint is different from the first paint. In an embodiment, the second paint comprises 5-12 wt % of propylene glycol methyl ether, 70-90 wt % of water, 0.5-2 wt % of nitrogen-based resin, 0.5-5 wt % of acrylic resin and 0.2-5 wt % of siloxane and nano organic silicon. Where, siloxane is beneficial for improving the wettability and adherence of the paint. The nano organic silicon is beneficial for improving the strain resistance of the coating and reducing the stickiness of the fingerprint.

It is noted that although the coating described in the above embodiments is composed of the primer layer and the topcoat layer. But the disclosure is not limited thereto. In other embodiments, the coating formed on the micro-arc oxidized surface is also a single paint layer which is formed on the micro-arc oxidized surface through a single coating process, so as to simplify the process.

Compared with the traditional micro-arc oxidation process, the surface treatment method of the disclosure is that surface sandblasting treatment, micro-arc oxidation treatment and anti-fingerprint coating process are combined to form a treatment technology for the ceramic appearance of the metal substrate. Further, the surface treatment method of the disclosure is that surface sandblasting treatment is carried out in advance to eliminate the flaws on the surface of the metal substrate before micro-arc oxidation treatment to provide exquisite surface texture while solving the rill mark problem of the metal substrate (especially a magnesium aluminum alloy). Subsequently, the appearance quality of the micro-arc oxidized surface after micro-arc oxidation treatment is improved by using special electrolytic solution, so that the surface of the metal substrate presents a special stone-imitated texture appearance effect while promoting the surface strength of the metal substrate. Finally, a coating with an anti-fingerprint effect is formed by means of special paint to cover the micro-arc oxidized surface to promote the resistance of the metal substrate surface on the fingerprint sticking so as to prevent fingerprint residue.

It is noted that the micro-arc oxidation treatment provided by the disclosure can effectively improve the surface strength of the metal substrate, there is no need to use appearance paint to conduct coating by a traditional technology after the micro-arc oxidation step, so as to effectively avoid the peeling of the appearance paint caused by user's collision.

The above descriptions are only preferred embodiments of the disclosure, and are not intended to limit the disclosure. Any forms of equivalent replacements or modifications or other variations can be made to the technical means and technical contents disclosed in the disclosure by those skilled in the art without departing from the scope of the technical means of the disclosure do not depart from the scope of the technical means of the disclosure, and still included within the scope of protection of the disclosure.

What is claimed is:

1. A surface treatment method adapted to a metal substrate having an appearance surface, the surface treatment method comprising:
   applying surface sandblasting treatment to the appearance surface to form a sandblasted surface;
   applying micro-arc oxidation treatment to the sandblasted surface in combination with an electrolytic solution to form a micro-arc oxidized surface; and
   forming a coating to cover the micro-arc oxidized surface;
   wherein, the components of the electrolytic solution comprise sodium phosphate, sodium silicate, sodium aluminate, potassium fluoride, potassium hydroxide, ammonium vanadate, potassium vanadate, disodium ethylenediaminetetraacetic acid (Na$_2$EDTA) and sodium tetraborate.

2. The surface treatment method according to claim 1, wherein a sandblasting material for the surface sandblasting treatment is silicon dioxide glass sand of 220 to 280 mesh, and a sandblasting pressure is from 0.2 MPa to 0.7 MPa.

3. The surface treatment method according to claim 1, wherein arithmetic average roughness (Ra) of the sandblasted surface is between 2.148 μm and 2.614 μm.

4. The surface treatment method according to claim 1, wherein a voltage for the micro-arc oxidation treatment ranges from 300 V to 750 V, and a treatment time for the micro-arc oxidation treatment is 10 min-60 min.

5. The surface treatment method according to claim 1, wherein the paint used in the step of forming the coating to cover the micro-arc oxidized surface comprises propylene glycol methyl ether, water, nitrogen-based resin, acrylic resin and siloxane.

6. The surface treatment method according to claim 1, wherein the step of forming the coating to cover the micro-arc oxidized surface comprises:
   forming a primer layer by using a first paint to cover the micro-arc oxidized surface; and
   forming a topcoat layer by using a second paint to cover the primer layer.

7. The surface treatment method according to claim 6, wherein the first paint comprises propylene glycol methyl ether, water, nitrogen-based resin, acrylic resin, siloxane and silica.

8. The surface treatment method according to claim 7, wherein the first paint comprises 5-12 wt % of propylene glycol methyl ether, 70-90 wt % of water, 0.5-2 wt % of nitrogen-based resin, 0.5-5 wt % of acrylic resin, 0.1-1 wt % of siloxane and nano organic silicon and 0.1-1 wt % of silica.

9. The surface treatment method according to claim 6, wherein the second paint comprises propylene glycol methyl ether, water, nitrogen-based resin, acrylic resin and siloxane.

10. The surface treatment method according to claim 9, wherein the second paint comprises 5-12 wt % of propylene glycol methyl ether, 70-90 wt % of water, 0.5-2 wt % of nitrogen-based resin, 0.5-5 wt % of acrylic resin, 0.2-5 wt % of siloxane and nano organic silicon.

11. The surface treatment method according to claim 1, wherein the electrolytic solution comprises 0.1-50 wt % of sodium phosphate, 0.1-50 wt % of sodium silicate, 0.1-20 wt % of sodium aluminate, 0.1-20 wt % of potassium fluoride, 0.1-10 wt % of potassium hydroxide, 0.1-10 wt % of ammonium vanadate, 0.1-10 wt % of potassium vanadate, 0.1-10 wt % of disodium ethylenediaminetetraacetic acid ($Na_2EDTA$) and 0.1-10 wt % of sodium tetraborate.

* * * * *